United States Patent [19]

Busch

[11] 3,861,485
[45] Jan. 21, 1975

[54] ELECTRIC MOTOR VEHICLE AND DRIVE SYSTEM THEREFOR

[75] Inventor: Heinrich Busch, Wesel, Germany

[73] Assignee: GES Gesellschaft fur elektrischen Strassenverkehr GmbH, Dusseldorf, Germany

[22] Filed: Aug. 22, 1973

[21] Appl. No.: 390,565

[30] Foreign Application Priority Data
Aug. 23, 1972 Germany.............................. 2241496

[52] U.S. Cl.................... 180/65 R, 74/689, 310/83, 318/11
[51] Int. Cl............................................ B60k 17/08
[58] Field of Search........... 180/65 R, 65 A; 74/689; 310/83; 318/9, 11, 12, 139, 521

[56] References Cited
UNITED STATES PATENTS

| | | | |
|---|---|---|---|
| 2,330,397 | 9/1943 | Trofimov | 74/689 |
| 2,519,118 | 8/1950 | Curtis et al. | 318/12 X |
| 2,546,869 | 3/1951 | Przybylski | 74/689 X |
| 3,202,234 | 8/1965 | Osborne | 180/65 R |
| 3,731,168 | 5/1973 | Strifler | 318/139 |

FOREIGN PATENTS OR APPLICATIONS
613,516    11/1948   Great Britain ................... 180/65 R

*Primary Examiner*—Lloyd L. King
*Assistant Examiner*—Randolph A. Reese
*Attorney, Agent, or Firm*—Karl F. Ross; Herbert Dubno

[57] ABSTRACT

The drive wheels of a motor vehicle are connected to the planet carrier of a planetary gear assembly whose sun gear is connected via direct gearing to the output shaft of a shunt-type electric motor. The ring gear is connected through a variable-ratio belt or chain drive to this output shaft so as to rotate the ring gear in a direction opposite that of the sun gear. Variation of the rotation speeds of the two gears determines the rotation speed of the planet carrier as the motor is operated continuously at the same rate. Even when stopped the motor is run so that all on-board systems may be operated off it. The variable-ratio mechanism of the transmission is operated through a damper by the accelerator pedal. At full speed the ring gear is disconnected from the variable-ratio drive and arrested for direct drive of the vehicle by the electric motor.

10 Claims, 1 Drawing Figure

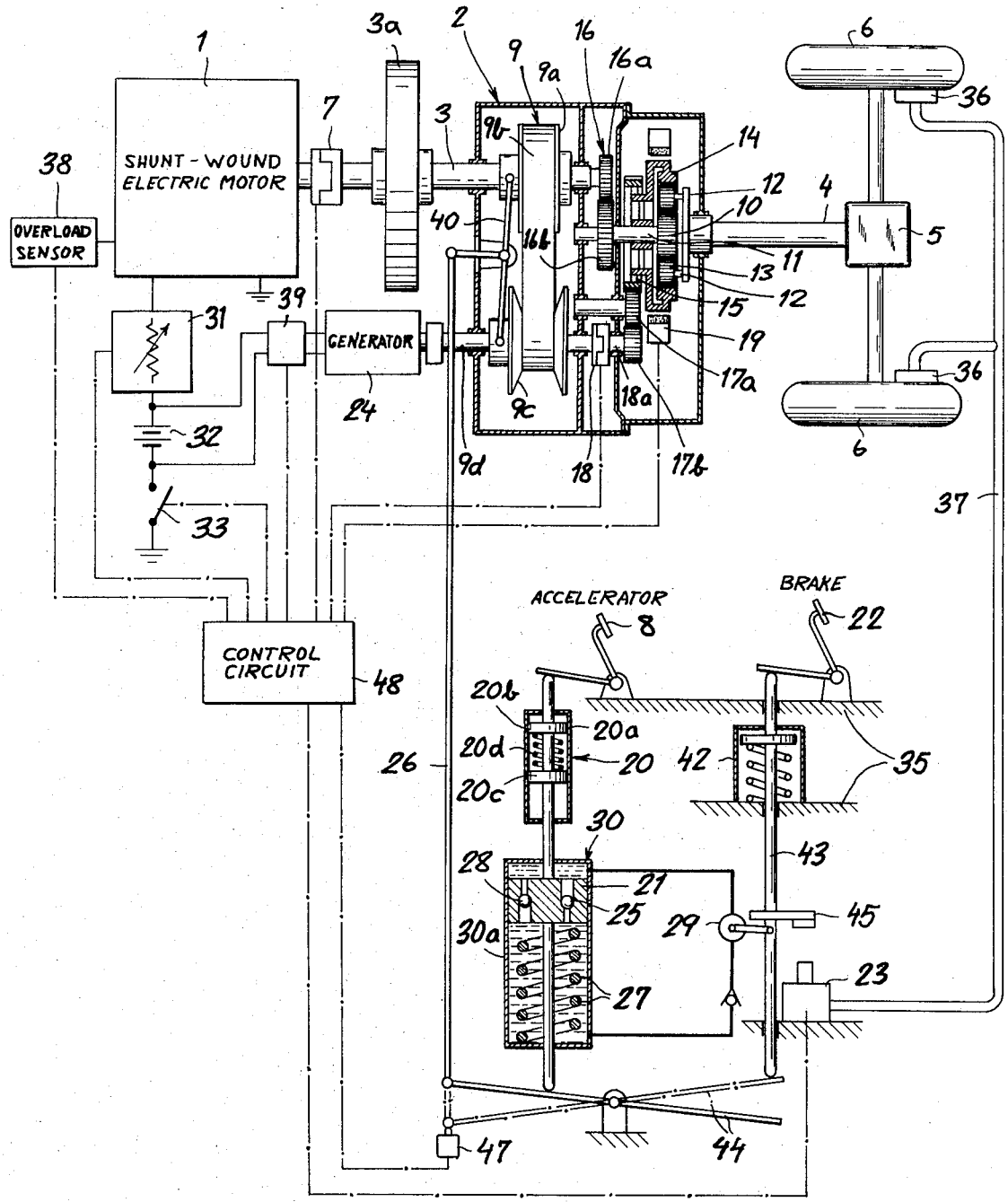

ELECTRIC MOTOR VEHICLE AND DRIVE SYSTEM THEREFOR

FIELD OF THE INVENTION

The present invention relates to an electrically driven motor vehicle and, more particularly, to an electric drive system and method for a motor vehicle.

BACKGROUND OF THE INVENTION

An electrically driven motor vehicle usually comprises basically a support having at least one drive wheel, a motor on the support connected to the drive wheel, and an accelerator pedal for varying the rotation speed of the drive wheel.

In the most conventional system a series-wound electric motor is connected directly through a mechanical transmission to the drive wheels and the rotation speed of these wheels is varied by means of a potentiometer between a battery and the motor.

Alternatively a shunt-wound motor is used with external excitation from a variable electronic source. Such arrangements are advantageous in that they give the same braking characteristics as an internal-combustion engine: slowing of the motor serves to brake the drive wheels. When this type of drive is operated at low speed the motor overheats because of its low efficiency at low speed. In addition it is necessary to run the various auxiliary systems--air conditioner, heater, radio, lights-off separate electrical drives because when the vehicle is stopped the main motor is stopped and cannot operate these elements. The control systems are quite expensive for such motors, and a continuously operating cooling system must be provided for the motor which otherwise would heat excessively at low speeds.

It has been suggested to overcome this difficulty by operating the vehicle with a shunt-wound motor, or at least a motor which is adapted to be run continuously at substantially the same speed, hereinafter referred to generally as a shunt-wound-type motor. Excessive heating of such a motor is not a problem as it will operate fairly cool at its ideal operating speed and various auxiliary systems can be driven directly by it. In addition it is not necessary to provide a complicated and expensive electronic control system since the motor speed is not varied outside of the very limited range. Such an arrangement however must have a complicated transmission offering many "speeds" or ratios in order to give uniform acceleration. Obviously such transmissions are complicated to make and use so that such a system is often impractical. Use of a hydraulic torque converter and transmission has proven unworkable also as the considerable losses in such devices make them unfit for use with the normally limited power of an electric motor.

OBJECTS OF THE INVENTION

It is, therefore, an object of the present invention to provide an improved electrically driven motor vehicle, and a method of operating such a vehicle, which overcome the aforedescribed disadvantages.

Another object is the provision of an improved but simplified electric drive for a motor vehicle or the like.

Yet another object is to provide an electric motor-vehicle drive which uses a shunt-wound motor or the like.

SUMMARY OF THE INVENTION

These ojbects are attained according to the present invention in a motor vehicle (car, truck, locomotive, trolley car, bus) having an electric motor which is operated at generally a constant speed and which is connected through a two-part transmission having an output shaft connected to the drive wheels of the vehicle. This transmission has an input shaft connected to the electric motor and two transmission mechanisms which are both connected to the output shaft and which turn this output shaft at a rate dependent on the ratio between the step-up or step-down ratios of the mechanisms. One of these mechanisms has a variable ratio and is controlled by the vehicle speed control so that operation of the speed control determines the rotation speed of the output shaft of the transmission.

According to a feature of this invention, the output shaft of the transmission is connected to the planet carrier of a planetary gear assembly. The one transmission mechanism is connected to the sun gear and the other to the ring gear. One of these mechanisms is variable and the two are set up to rotate the sun and ring gears in opposite directions. Thus it is possible to rotate both elements and have the planet carrier stopped, variation of the one transmission alters this ratio and starts this carrier rotating.

In accordance with this invention the variable torque-transmitter is a chain or V-belt drive with variable-pitch pulleys connected to the ring gear, whereas the sun gear is connected through a constant-mesh gear train to the input shaft of the transmission. The V-belt drive may be disconnected from the ring gear by means of a clutch and this ring gear may be arrested by a brake for direct driving of the output shaft of the transmission by the motor.

Such a system allows for the operation of the motor at a constant ideal speed while the drive wheels are driven at a steplessly adjustable speed. In addition the motor serves as a brake, much as an internal-combustion motor in a conventional motor vehicle.

In accordance with another feature of another feature of the present invention the accelerator is connected to the control element of the variable-ratio mechanism through a damper which prevents this control element from being displaced faster than a predetermined rate. This rate is established according to the overload characteristics of the motor and is adapted to protect this motor from such an overload which may suddenly tax it excessively.

The generator of the motor vehicle is, according to yet another feature of this invention, connected to one of the transmission mechanisms and is operable as a motor so that under normal circumstances it generates electricity for the various vehicular auxiliary systems, and otherwise can be employed as a booster motor for displacing the vehicle under extremely heavy loads or up very steep gradients.

BRIEF DESCRIPTION OF THE DRAWING

The above and other objects, features, and advantages of the invention will become more readily apparent from the following description, reference being made to the accompanying drawing in which the sole FIGURE is a diagrammatic representation of a system according to the present invention.

SPECIFIC DESCRIPTION

As shown in the FIGURE a shunt-wound type electric motor 1 adapted to run at a predetermined speed is connected on one side to ground and on the other side through a control circuit 31 to a battery 32 in turn connected through a switch 33 to ground. The output shaft of the motor 1 is connected through a clutch 7 to a shaft 3 carrying a flywheel 3a.

The shaft 3 is the input shaft of a two-part transmission 2 having an output shaft 4 connected through a differential 5 to drive wheels 6 of a motor vehicle whose chassis is indicated at 35. The wheels 6 are provided with standard hydraulic brakes 36 operated through a line 37 by a master cylinder 23 operable by a brake pedal 22 of the vehicle 35.

The transmission 2 has a planetary gear arrangement comprising a planet carrier 12 on which are mounted planet gears 13 meshing with a central sun gear 10 and a peripheral ring gear 14. The sun gear 10 is carried on a shaft 11 connected to the motor 1 via a gear train 16 comprising a gear 16a on the shaft 3 and a gear 16b on the shaft 11. Thus rotation of the motor 1 in one direction will effect rotation of the sun gear 10 in the opposite direction. The ring gear 14 is connected via a unidirectional clutch 15 to a gear 17a meshing with a gear 17b carried on the output shaft 18a of an electric clutch 18. A variable-ratio transmission 9 comprises a variable-pitch pulley 9a carried on the shaft 3 and connected by a V-belt 9b to another variable-pitch pulley 9c carried on a shaft 9d connected to the input of the clutch 18a. Thus with the clutch 18 engaged, the ring gear 14 will rotate in the same direction as the motor 1. A brake 19 is engageable with the ring gear 14 to arrest it. The shaft 9d is connected to a motor-generator 24 connected through a control circuit 39 across the battery 32 to alternatively charge this battery 32 or operate the generator 24 as a motor for power assist.

In the illustrated position of the two pulleys 9a and 9c, with the former pulled tight and the latter opened up by means of an operating lever 40 pivoted on the transmission 2, the ring gear 14 rotates faster than the sun gear 10 by a rate equal to the proportion of the number of the former's teeth to the number of the latter's teeth. Thus the planet gears 13 spin but the carrier 12 does not move and the vehicle 35 remains standing, even though the motor 1 is running. At the same time the generator 24 is operating to run the various systems — lights, radio, air conditioning, and the like — of the vehicle.

The lever 40 is operated by a rod 26 linked through a damper 30 and a force transmitter 20 to an accelerator pedal 8. To this end the force-transmitter 20 comprises a cylindrical tube 20a containing two pistons 20b and 20c connected together by a spring 20d. The piston 20c is connected to a piston 21 of the damper 30 which has a housing 30a filled with fluid surrounding the piston 21. A pair of restriction/check-valves 25 and 28 in the piston 21 permits limited fluid flow therethrough in opposite directions, and a spring 27 urges the piston 21 into a position corresponding to an up or "slow" position of the accelerator pedal 8. It should be clear that such a system will prevent displacement of the rod 26 at a rate faster than that permitted by the restrictions 25 and 28 regardless of how fast the pedal 8 is actuated. This serves to protect the motor 1 from overload since overly rapid displacement of this rod could lead to burning out the motor by overstraining it.

The brake pedal 22 is biased by a spring 42 into the up position and has a rod 43 which is connected to a valve 29 which permits fluid flow when the brake is depressed from above to below the piston 21, so as to bypass the restriction 25 and allow the variable-ratio transmission 9 to return rapidly to the illustrated position. The lower end of the rod 43 engages a lever 44 pivoted on the vehicle 35 and operated by the damper 20 so that depression of this rod 43 even with the accelerator pedal 8 depressed will ensure lifting of the rod 26 and slowing of the vehicle. In addition, the rod 43 carries an arm 45 which is engageable after a predetermined displacement with the piston rod of the master cylinder 23 so as to operate the brakes 36. The lever 44 also operates a switch 47 which is connected to a control circuit 48 for the apparatus which is also connected to On-Off switch 33, controller 31, motor-generator reverser 39, clutch 7, clutch 18, and master cylinder 23.

The system described above operates as follows:

The motor 1 is switched on by switch 33 and is set to operate by control 31 at its most efficient speed. Then the clutch 7 and clutch 18 are closed so as to rotate the ring gear 14 in one direction and the sun gear 10 in the opposite direction. As mentioned above, so long as the accelerator pedal 8 is not depressed, the rotation speeds of these elements 10 and 14 are such that the output shaft 4 will not rotate.

The accelerator pedal 8 is then depressed to move the vehicle from a stop. If is is depressed slowly the rod 26 will move at a rate directly proportional to the rate of displacement of the pedal 8. Faster depression, however, will be ineffective to move the rod 26 faster than a rate at which the motor 1 can safely accelerate the vehicle. The rod 40 will spread the pulley 9a and close the pulley 9c so as to rotate the ring gear 14 increasingly more slowly, and thereby cause the planet carrier 12 to rotate increasingly more rapidly.

Once the rod 44 engages the switch 47, the control circuit 48 opens the clutch 18 and closes the brake 19 to arrest the ring gear 14 completely. This cuts out the transmission 9 and drives the output shaft 4 directly from the input shaft 3, via gears 16a, 16b, 10 and 13. At the same time the generator 24 is operating to ensure continued functioning of the various above-mentioned auxiliary systems.

At this high speed limited variation of the speed of the vehicle is possible by means of the control 31 which varies the motor speed within limits. It is clearly simpler to vary vehicle speed with motor speed only within a narrow range than it is to control the motor speed over a wider range.

To slow the vehicle the operator need merely release the accelerator pedal 8. This action allows the piston 21 to rise in the cylinder 30a at a rate determined by the restriction 28. The clutch 18 is again closed and the brake 19 opened and the torque exerted by the rotating wheels 6 on the motor operates this motor 1 as a generator, thereby giving a braking effect identical to that achieved in an internal-combustion engine driven vehicle. The rate of return of the piston 25 determines the amount of braking current generated by the motor 1, so as to prevent overload of the system again.

In order to slow the vehicle at a more rapid rate or stop the vehicle, the brake pedal 22 is depressed. Such depression first opens the valve 29 to allow the piston 21 to return rapidly. Should the driver inadvertently be still depressing the accelerator pedal 8, depression of the brake will force the lever 44 up and lift his accelerator pedal. Further depression of the pedal 22 brings the arm 43 against the master cylinder 23 to operate the brakes 36. The clutch 7 is simultaneously opened to prevent damage to the motor 1.

The overload sensor 38 detects when the motor 1 is being operated at a rate that might damage it and automatically switches the generator 24 over to a motor function to assist the motor 1 temporarily. Such a condition is only possible at low speeds when, for example, starting up with a very heavy load or ascending a very steep gradient. Reverse is effected by reversing the motor 1 electrically, as is conventional, or by speeding up the ring gear 14 beyond the speed at which the vehicle is held stationary.

The above-described system allows an electric-motor vehicle to operate much as a vehicle with an internal-combustion engine. The various subsystems of the vehicle are operated directly off its electric motor which runs at all times. At low speeds the motor is connected via a variable-ratio transmission to the wheels, and for higher travel speeds it is connected directly thereto. At all times the motor operates so as to overcome many of the disadvantages of the prior-art devices.

I claim:

1. An electric drive for a motor vehicle having an accelerator and at least one drive wheel, said drive comprising:
   an electric motor of the shunt-wound type operable at a generally uniform speed;
   a transmission having an input shaft operatively connected to said motor and a pair of output shafts and including
   mechanism connected between said input shaft and one of said output shafts for transmitting force therebetween at a fixed speed ratio, and
   mechanism connected between said input shaft and the other output shaft for transmitting force therebetween at a variable speed ratio and having a control element displaceable for changing said variable ratio;
   means connected between said output shafts and said drive wheel for rotating the latter at a speed depending on the rotation speeds of said output shafts;
   means between said accelerator and said control element for varying said ratio and thereby the rotation speed of said drive wheel; and
   damper means between said accelerator and said control element for preventing displacement of said control element faster than a predetermined speed regardless of displacement speed of said accelerator, said predetermined speed being such as to prevent overload of said motor.

2. The drive defined in claim 1 wherein said means for rotating said drive wheels is a planetary gear assembly having a sun gear operatively connected to one of said output shafts, a ring gear operatively connected to the other of said output shafts, at least one planetary gear meshing with said ring gear and said sun gear, and a planetary-gear carrier operatively connected to said drive wheels.

3. The drive defined in claim 2 wherein the fixed-ratio mechanism includes a plurality of intermeshing gears.

4. The drive defined in claim 3 wherein the variable-ratio mechanism includes a belt drive having a pair of variable-pitch pulleys operable by said control element and a belt reeved over said pulleys.

5. The drive defined in claim 2 wherein said gun gear is operatively connected through the fixed-ratio mechanism to said input shaft and said ring gear is operatively connected through the variable-pitch mechanism to said input shaft, said drive further comprising a clutch in said variable-ratio mechanism and a brake for arresting said ring gear, whereby with said clutch open and said brake engaged said motor drives said sun gear directly through said fixed-ratio mechanism.

6. The drive defined in claim 1, further comprising a brake pedal on said motor vehicle and means coupling said pedal to said control element.

7. A method of driving a motor vehicle comprising the steps of:
   rotating an input shaft of a split-path transmission having a pair of output shafts at a generally uniform speed;
   rotating one of said output shafts at a speed defining a fixed ratio with the speed of said input shaft;
   rotating the other of said output shafts at a speed variable relative to the speed of said input shaft;
   driving the vehicle at a rate dependent on the ratio of the speeds of said output shafts;
   controlling the drive speed of said vehicle by varying the transmission ratio between said input shaft and said other output shaft, said transmission having a control element displaceable to vary said transmission ratio and said vehicle having an electric drive motor of the shunt-wound type connected to said input shaft and having an accelerator linked to said control element to displace same and vary said transmission ratio; and
   displacing said control element slower than a maximum speed such that the overload torque of said drive motor is not exceeded.

8. The method defined in claim 7, further comprising the step of, at least for elevated drive speeds of said vehicle, further varying the drive speed of said vehicle by varying the speed of said input shaft.

9. The method defined in claim 7 wherein said vehicle has an electric motor driving said input shaft and a generator connected to and operated by said transmission, said method further comprising the step of operating said generator as a motor to provide auxiliary power to said transmission.

10. The method defined in claim 7 wherein said transmission has a control element displaceable to vary said transmission ratio and said vehicle has a brake pedal connected to wheel brakes to operate same, said method further comprising the step of operating said control element with said brake pedal.

* * * * *